United States Patent
Le

(10) Patent No.: US 10,119,259 B2
(45) Date of Patent: Nov. 6, 2018

(54) FLOW DIVERTER WITH ANTISIPHON

(71) Applicant: FLUIDMASTER, INC., San Juan Capistrano, CA (US)

(72) Inventor: Tuan Le, Fountain Valley, CA (US)

(73) Assignee: FLUIDMASTER, INC., San Juan Capistrano, CA (US)

( * ) Notice: Subject to any disclaimer, the term of this patent is extended or adjusted under 35 U.S.C. 154(b) by 110 days.

(21) Appl. No.: 15/426,222

(22) Filed: Feb. 7, 2017

(65) Prior Publication Data

US 2017/0152652 A1 Jun. 1, 2017

Related U.S. Application Data

(63) Continuation-in-part of application No. PCT/US2016/022173, filed on Mar. 11, 2016.

(60) Provisional application No. 62/132,400, filed on Mar. 12, 2015.

(51) Int. Cl.
*E03D 1/06* (2006.01)
*E03D 1/32* (2006.01)
*E03D 1/30* (2006.01)

(52) U.S. Cl.
CPC .............. *E03D 1/32* (2013.01); *E03D 1/302* (2013.01)

(58) Field of Classification Search
CPC .............. E03D 1/32; E03D 1/30; E03D 1/36
USPC ..................... 4/324, 331, 374, 370
See application file for complete search history.

(56) References Cited

U.S. PATENT DOCUMENTS

| 3,172,128 | A | | 3/1965 | Ducey | |
|---|---|---|---|---|---|
| 4,318,194 | A | * | 3/1982 | Pinkston | E03D 1/00 137/410 |
| 4,408,361 | A | | 10/1983 | Rozek | |
| 5,175,894 | A | * | 1/1993 | Chen | E03D 1/36 137/876 |
| 5,452,482 | A | * | 9/1995 | Nichols-Roy | E03D 1/32 137/441 |
| 6,385,788 | B1 | * | 5/2002 | Wasielewski | E03D 1/32 137/441 |
| 7,376,984 | B2 | * | 5/2008 | Molter | E03D 1/32 4/415 |

OTHER PUBLICATIONS

International Searching Authority, International Search Report for International Application No. PCT/US2016/022173, dated May 17, 2016, 3 pages.
International Searching Authority, Written Opinion for International Application No. PCT/US2016/022173, dated May 17, 2016, 6 ppges.

* cited by examiner

*Primary Examiner* — Lauren Crane
(74) *Attorney, Agent, or Firm* — Greenberg Traurig, LLP

(57) ABSTRACT

A flow diverter for diverting flow between a toilet bowl and a toilet tank, having: a body having an inlet, a first outlet and a second outlet; and a flow adjustment mechanism rotatable within the body to selectively divert different percentages of flow between the first outlet and the second outlet; and an air vent and diaphragm in the body to prevent a siphon flow from the first or second outlet back to the inlet.

22 Claims, 15 Drawing Sheets

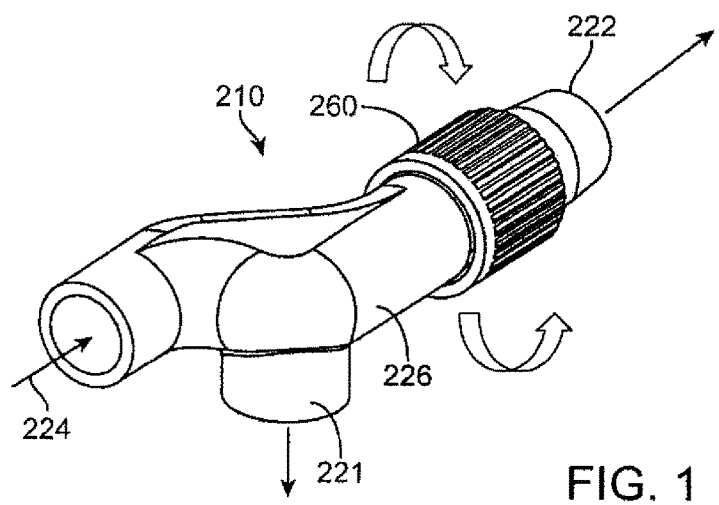
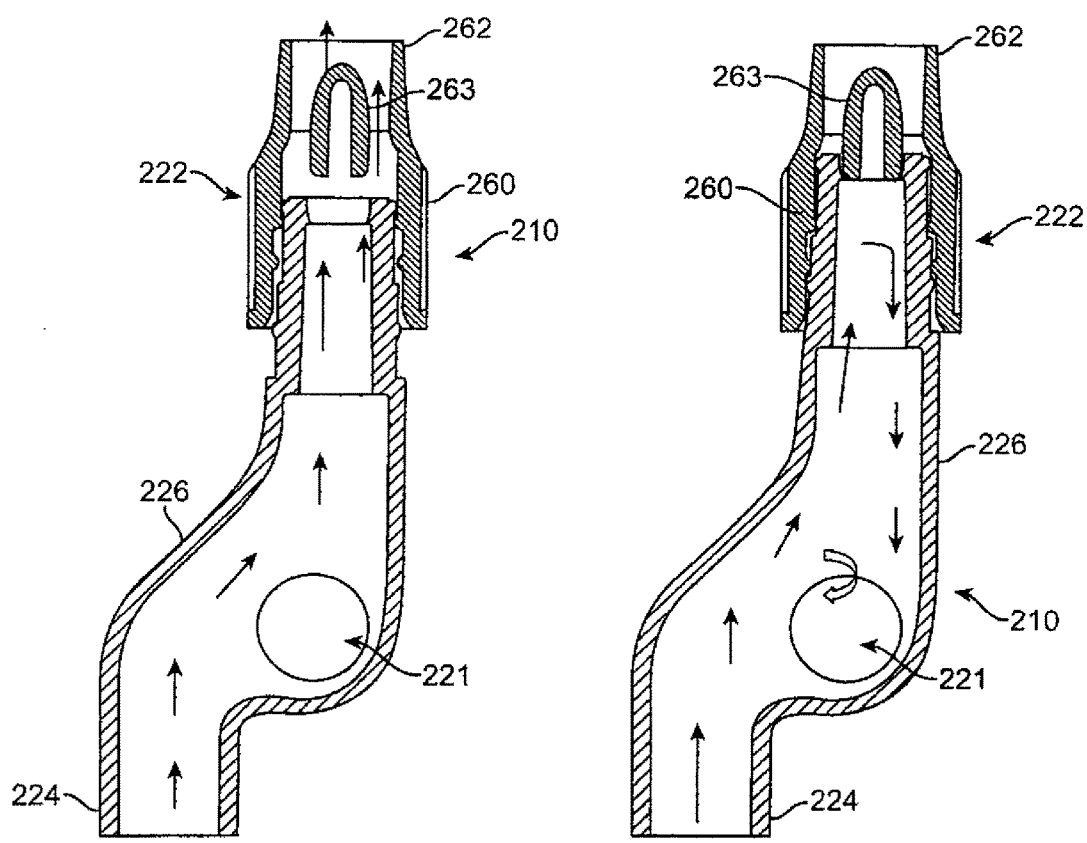
FIG. 1
FIG. 2
FIG. 3

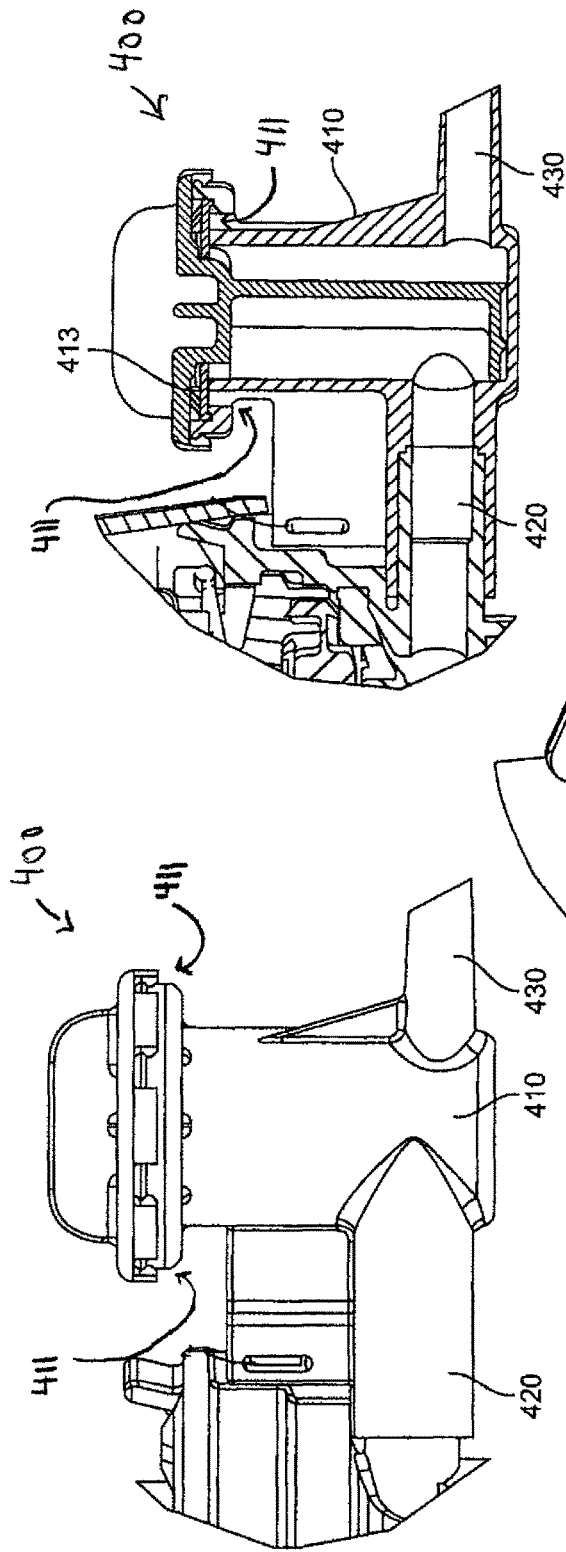
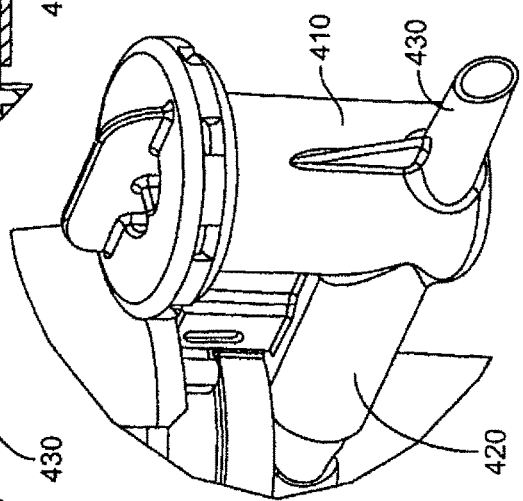
FIG. 5C
FIG. 5D
FIG. 5B

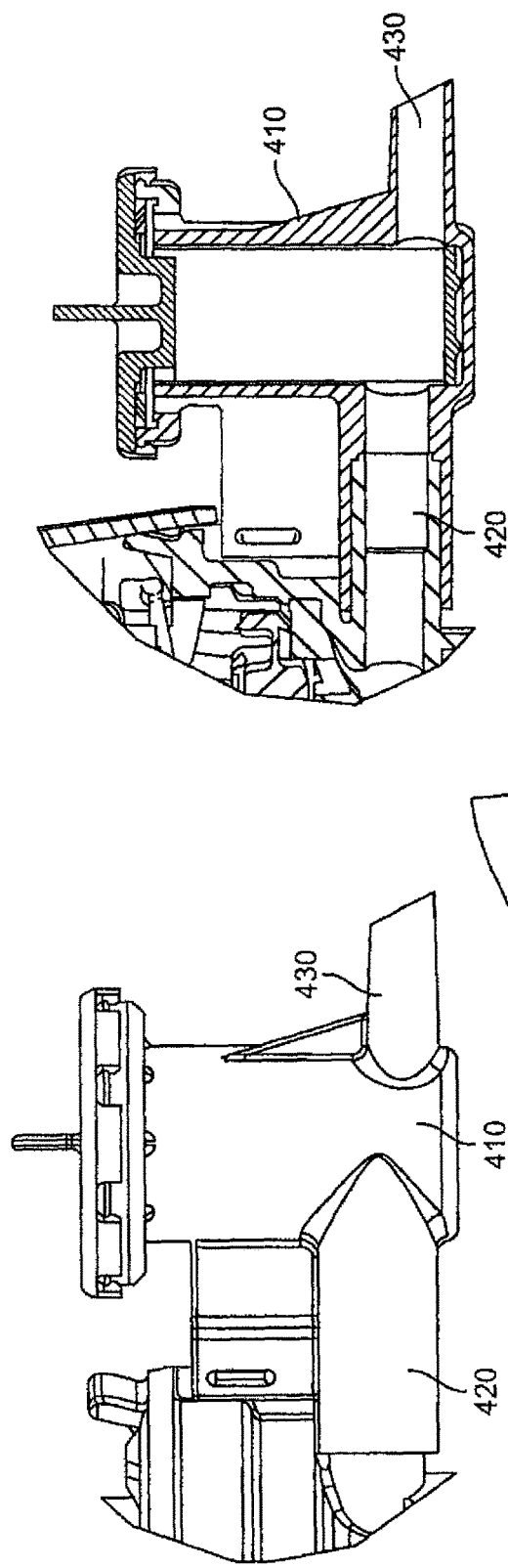
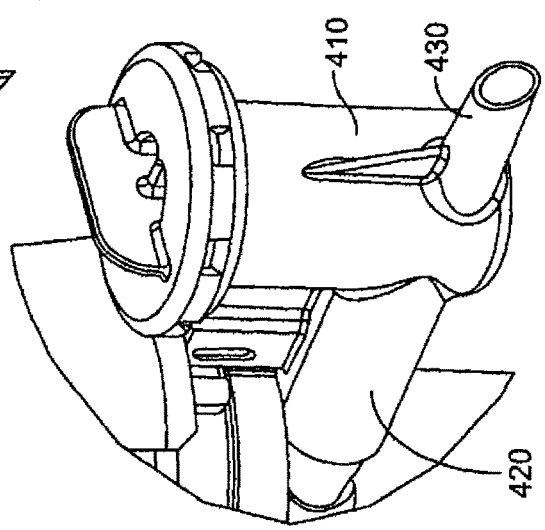
FIG. 5H
FIG. 5I
FIG. 5G

FLOW DIVERTER WITH ANTISIPHON

RELATED APPLICATION

The present application is a continuation-in-part of published PCT Application PCT/US16/22173, filed Mar. 11, 2016, titled "Flow Diverter With Antisiphon", which claims priority to U.S. Provisional Patent Application 62/132,400, entitled "Improved Fill Valve" filed Mar. 12, 2015.

FIELD

This disclosure relates generally to fill valves and flow diverters for filling a toilet tank and bowl with water.

BACKGROUND

Current toilet fill valves provide water both to fill the toilet tank and to fill the toilet bowl. Preferably, the filling of both is completed at the same time. In typical fill valves, a large flow is sent to refill the toilet tanks and a small flow is sent to refill the toilet bowl. In some designs, the large flow into the tank comes from an orifice at the bottom of the valve, whereas the small flow into the bowl comes from a small tube at the top of the valve, wherein the small tube is directed into the flush valve's overflow tube.

Since the volume of the toilet tank is larger than the volume of the toilet bowl, traditional valves employ flow control valves that restrict some of the flow going into the toilet bowl (such that the refilling of both tank and bowl is completed at the same time).

Unfortunately, by restricting the flow to the bowl, the internal valve pressure in the fill valve is increased. This in turn increases the sound level of the refilling. An ideal solution to this problem would not increase system refilling noise.

Another problem common to existing products are that they are simply not accurate enough. Rather, the toilet bowl fills too quickly or too slowly (as compared to the refilling of the tank). Ideally, it would instead be desirable to have an adjustable mechanism such that the various percentages of water diverted to either the tank or the bowl could be finely adjusted.

Yet another problem with existing flow control valves is the problem of siphoning. Siphoning occurs when the toilet becomes flooded (or the water pressure from the building drops) such that water is pulled back from the fill valve into the building's plumbing. A danger with existing fill diverters is that should such a siphon flow start to occur, it is important that the fluid path between the toilet bowl and the building plumbing be broken immediately such that water from the toilet bowl cannot be drawn back into the building's water supply.

SUMMARY

The following simplified summary is provided in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In a first embodiment, a flow diverter for diverting flow between a toilet bowl and a toilet tank, comprises: a body having an inlet, an outlet and a pressure relief vent between the inlet and the outlet; and a flow adjustment mechanism rotatable around the outlet of the body to selectively divert different percentages of flow between the outlet and the pressure relief vent. Preferably, the flow adjustment mechanism comprises: a sleeve received over the outlet, wherein the sleeve has a threaded inner surface that mates with a threaded outer surface of the outlet; and a stopper that is slidably received into the outlet. The stopper is moved axially in the outlet as the sleeve is rotated around the outlet, thereby varying the size of the fluid path (around the stopper) through the outlet.

A first advantage of the present design is that the size of the fluid path through the outlet is continuously adjustable as the sleeve is rotated. Therefore, fine adjustments can be made to the relative percentages of water diverted between each of the toilet tank and the toilet bowl. The internally threaded fastener portion of the sleeve may include an internal stop surface, and wherein rotably positioning the outlet of the body in contact or communication with the stop surface of the adjustment mechanism ceases flow of water into the toilet bowl.

Preferably, the body of the flow diverter is curved such that flow going into the inlet is in the same direction (i.e.: parallel) with flow coming out of the outlet, however, the two flows are not co-axial with one another. The advantage of this curved design is that it better directs flow from the inlet to the outlet. Preferably as well, the flow into the inlet is in a direction perpendicular to the flow out of the pressure relief vent. The advantage of this is that it tends to direct flow away from the pressure relief vent when the outlet is open.

Preferably, the water flow from the outlet is diverted to the toilet bowl and flow out of the pressure relief vent is diverted to the toilet tank. Specifically, a tube extending from the outlet can be directed into a flush valve overflow tube such that the flow of water passing therethrough will be directed to the toilet bowl.

Typically the water that is directed through the present flow diverter is only a small portion of the water that is supplied by the fill valve. The larger portion of water supplied by the fill valve is delivered directly into the toilet tank (for example, through a large orifice on the bottom or top of the fill valve). The much smaller portion of water this is directed through the present flow diverter is for use in refilling the toilet bowl. However, in accordance with the present invention, the portion of water passing through the diverter that isn't sent to the toilet bowl is instead directed into the toilet tank (joining the larger portion of water supplied by the fill valve to refill the toilet tank). It is to be understood, that the flow diverter installation can be reversed such that the flow from the outlet can be diverted to the toilet tank and flow out of the pressure relief vent can instead be diverted to the toilet bowl. Optionally, between approximately 0% and 100% of water flowing through the body may be deliverable to the toilet bowl or toilet tank.

The present diverter valve also provides an anti-siphon feature in that should a siphon force ever become applied to the outlet, air will be drawn back into the pressure relief vent. This is because the pressure relief vent is positioned high above the water level of the tank.

To the accomplishment of the foregoing and related ends, certain illustrative aspects are described herein in connection with the following description and the annexed drawings. These aspects are indicative, however, of but a few of the various ways in which the principles of the claimed subject matter may be employed and the claimed subject matter is intended to include all such aspects and their equivalents.

Other advantages and novel features may become apparent from the following detailed description when considered in conjunction with the drawings.

BRIEF DESCRIPTION OF THE DRAWINGS

FIG. 1 is a perspective view of a first embodiment of the present flow diverter having features that adjust refill flow to the bowl and the toilet tank.

FIG. 2 is a side elevation view of the flow diverter of FIG. 1, with the water flow path out of the outlet fully opened.

FIG. 3 is side elevation view of the flow diverter of FIG. 1, with the water flow path out of the outlet fully closed.

FIG. 5B is a close-up side elevation view of the flow diverter of FIG. 5A, with the water flow path out of the outlet and into the toilet bowl fully closed.

FIG. 5C is a sectional view corresponding to FIG. 5B.

FIG. 5D is a perspective view corresponding to FIG. 5B.

FIG. 5G is a close-up side elevation view of the flow diverter of FIG. 5A, with the water flow path out of the outlet and into the toilet bowl fully opened.

FIG. 5H is a sectional view corresponding to FIG. 5G.

FIG. 5I is a perspective view corresponding to FIG. 5G.

DETAILED DESCRIPTION

Figure 4A:
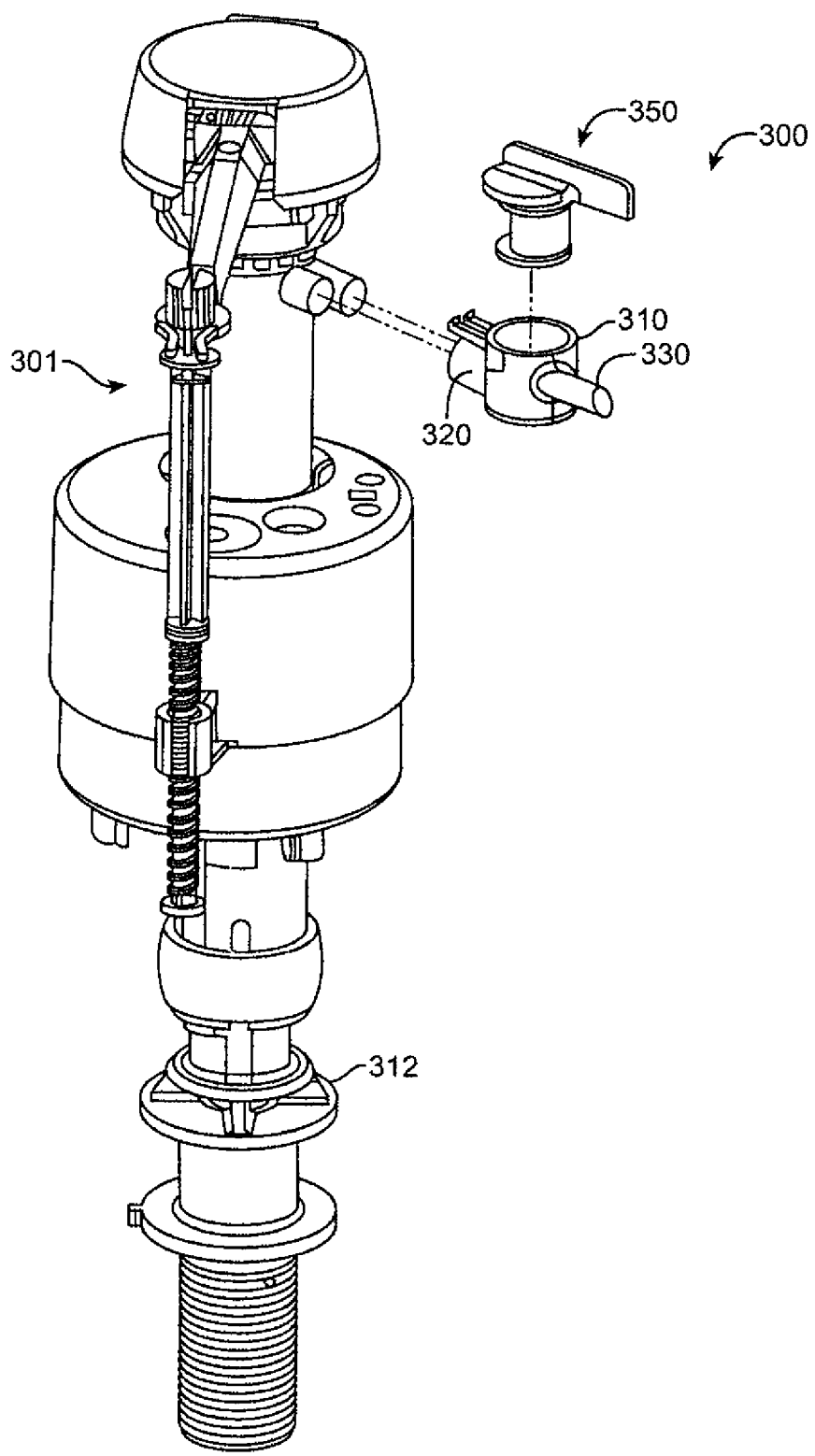
FIG. 4A is an exploded perspective view of a second embodiment of the flow diverter.

The features of the presently disclosed solution may be economically molded or assembled by using one or more distinct parts and associated components which, may be assembled together for removable or integral application with a known or to-be-designed toilet flushing systems in an economical manner, wherein the features of the present disclosure may form the herein disclosed servicing apparatus regardless of the particular form. Unless defined otherwise, all terms of art, notations and other scientific terms or terminology used herein have the same meaning as is commonly understood by one of ordinary skill in the art to which this disclosure belongs.

As used herein, "a" or "an" means "at least one" or "one or more." As used herein, the term "user", "subject", "end-user" or the like is not limited to a specific entity or person. For example, the term "user" may refer to a person who uses the systems and methods described herein, and frequently may be a field technician. However, this term is not limited to end users or technicians and thus encompasses a variety of persons who can use the disclosed systems and methods.

The disclosed solution can now be better understood turning to the following detailed description. It is to be expressly understood that the illustrated embodiments are set forth as examples and not by way of limitations on the embodiments as ultimately defined in the claims.

As seen in FIGS. 1 to 3, the present system 210 provides a flow diverter for diverting flow between a toilet bowl and a toilet tank, comprising: a body 226 having an inlet 224, an outlet 222 and a pressure relief vent 221 positioned between inlet 224 and outlet 222; and a flow adjustment mechanism 260 that is rotatable around outlet 222 of body 226 to selectively divert different percentages of flow between outlet 222 and the pressure relief vent 221.

Preferably, flow adjustment mechanism 260 comprises a sleeve 264 received around outlet 222. Preferably, sleeve 264 has a threaded inner surface that mates with a threaded outer surface of the outlet (as seen in FIGS. 2 and 3). Preferably, sleeve 264 may comprise an externally positioned grip or friction inducing surface making it easy for an end user to grasp onto and manually adjust.

A stopper 263 is slidably received into outlet 222. In operation, stopper 263 is moved axially back and forth into the mouth of outlet 222 as sleeve 263 is rotated around the mouth of outlet 222. Axial movement of stopper 263 varies the size of the fluid path opening through the outlet. (The fluid path through outlet 222 is around stopper 263 between stopper 263 and the interior walls of outlet 222). As can be seen in FIGS. 2 and 3, the size of the fluid path through outlet 222 is continuously adjustable as sleeve 263 is rotated.

In optional preferred embodiments, stopper 263 has an internal bore extending partially therethrough, as shown.

In various embodiments, body 226 is curved as shown such that flow into inlet 224 and flow out of outlet 222 are parallel but not co-axial with one another. In various embodiments, the flow into inlet 224 is in a direction perpendicular to flow out of the pressure relief vent 221.

Preferably, the water flow from outlet 222 is diverted to the toilet bowl and the water flow out of pressure relief vent 221 is diverted to the toilet tank. For example, system 210 may be positioned mid-way between the fill valve and the overflow tube of the flush valve such that water directed out of the outlet 222 can go through a tube into the overflow tube of the flush valve, while water coming out of pressure relief vent 221 can simply drip down into the toilet tank below. It is to be understood, however, that flow from outlet 222 can instead be diverted to the toilet tank and flow out of pressure relief vent 221 can be diverted to the toilet bowl.

FIGS. 2 and 3 are sectional elevation views showing movement of stopper 263 from the fully "open" position of FIG. 2 to the fully "closed" position of FIG. 3.

In FIG. 2 when adjustment mechanism 260 is positioned in an open position permitting water to flow out of outlet 222, there is relatively little restriction caused by stopper 263 (see arrows with flow direction). As such, water is permitted to egress through outlet 222 and sleeve end 262 into bowl refill and typically down the flush valve overflow tube and into the toilet bowl. In contrast, in FIG. 3 it can be seen that adjustment mechanism 260 is been rotated into a closed state. As such, the resistance to flow to the bowl refill through outlets 222 and 262 is gradually increased as the element 263 of mechanism 260 closes outlet 222. As a consequence, water inside body 226 backs up gradually as the restriction is increased. As the restriction is increased and the water backs up, a greater percentage of the water begins to exit through pressure relief 221 where it delivered into the toilet tank.

In FIG. 3, the refill of the toilet bowl is completely shut off so that all the water exits through pressure relief 221 to drop down into the toilet tank.

Preferably, the present flow diverter 210 also prevents a reverse siphon flow from forming between the building plumbing and the toilet bowl. This is accomplished by the outlet 222 drawing air back through the pressure relief vent 221 due to a gap between the water level in tank 4 and outlet 222 that is sufficiently sized so that when a vacuum is formed in the main water supply, none of the water in the toilet tank 4 is sucked back into the water supply. Instead, air would be sucked back into the water supply. Thus, system 210 incorporates a type AC anti-siphon device making the valve acceptable with worldwide standards and market conditions.

The present flow adjustment mechanism 260 provides improved adjustment accuracy over prior disclosed fill valves in the art. This is because many current refill adjustment methods adjust in steps and usually flow in large increments. Therefore, the present flow diverter is particularly advantageous as the amount of water used to flush a toilet is gradually reducing as toilet technology is improving. Significantly, as water becomes scarcer and toilet standards require less water usage, such incremental and precise adjustment will render mechanism 226 extremely advantageous and superior over currently employed solutions.

Figure 4B:
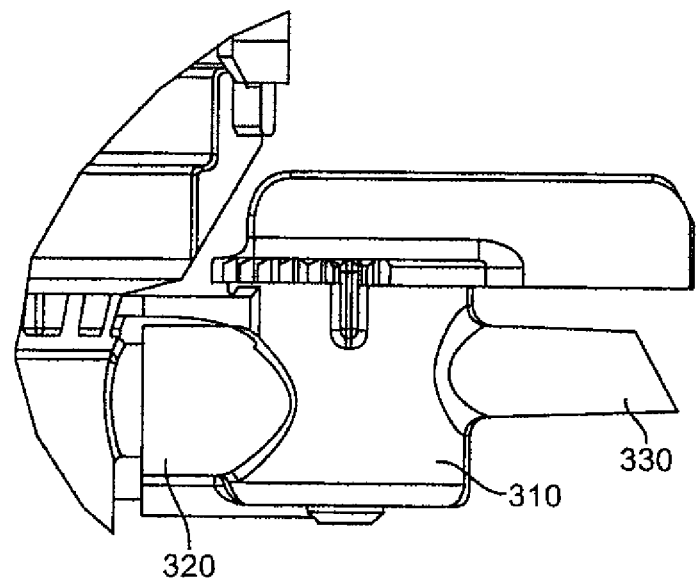
FIG. 4B is a close-up side elevation view of the flow diverter of FIG. 4A, with the water flow path out of the outlet and into the toilet bowl fully closed.
Figure 4C:
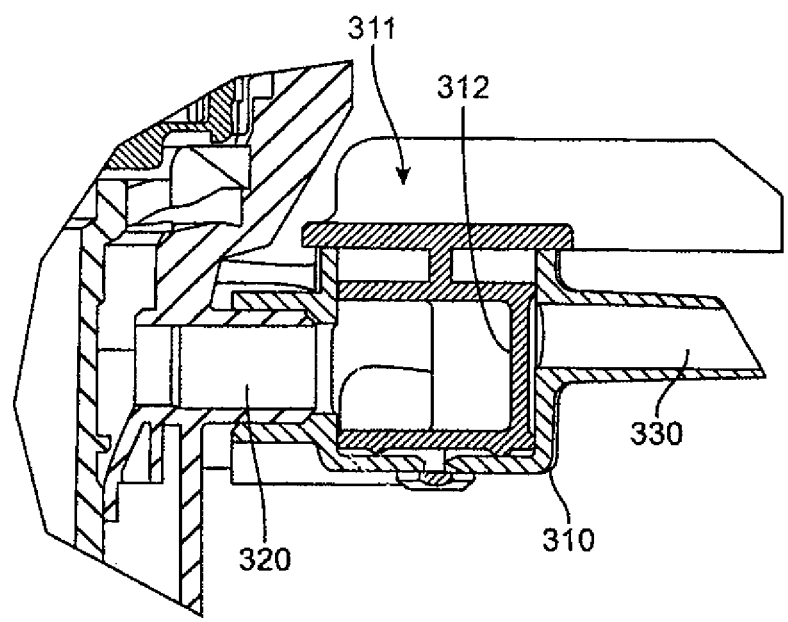
FIG. 4C is a sectional view corresponding to FIG. 4B.
Figure 4D:
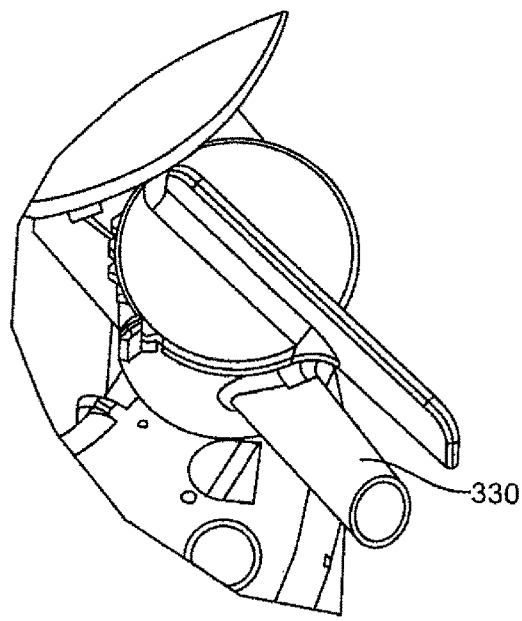
FIG. 4D is a perspective view corresponding to FIG. 4B.
Figure 4E:
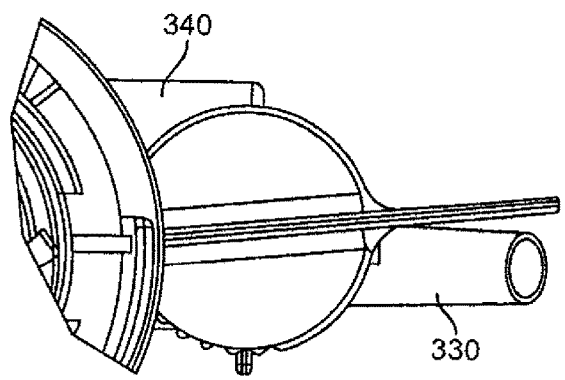
FIG. 4E is a top plan view corresponding to FIG. 4B.
Figure 4F:
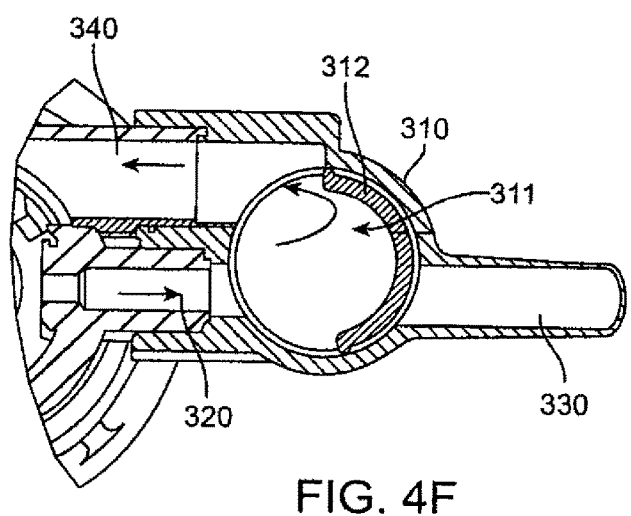
FIG. 4F is a top sectional view corresponding to FIG. 4B showing the internal flow path when the water path into the toilet bowl is fully closed.
Figure 4G:
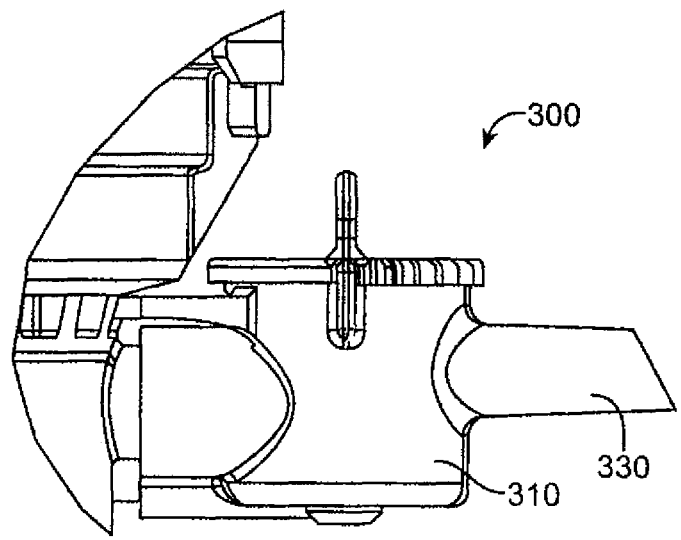
FIG. 4G is a close-up side elevation view of the flow diverter of FIG. 4A, with the water flow path out of the outlet and into the toilet bowl fully opened.
Figure 4H:
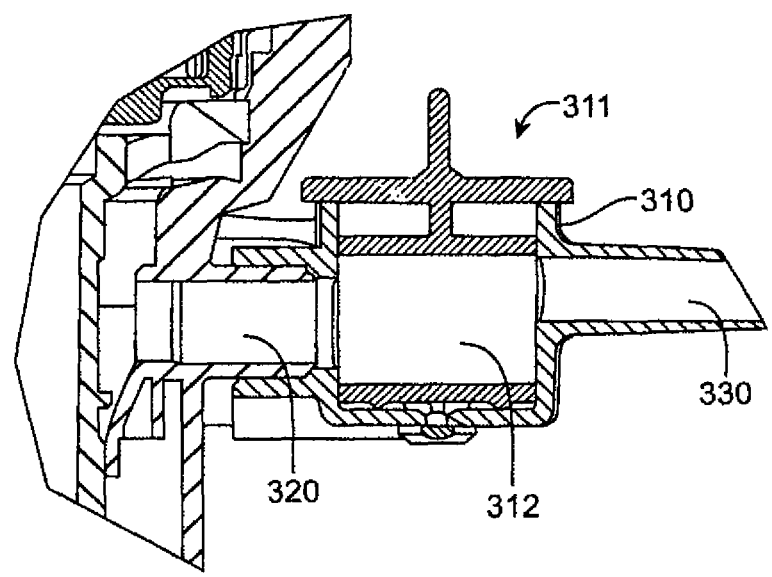
FIG. 4H is a sectional view corresponding to FIG. 4G.
Figure 4I:
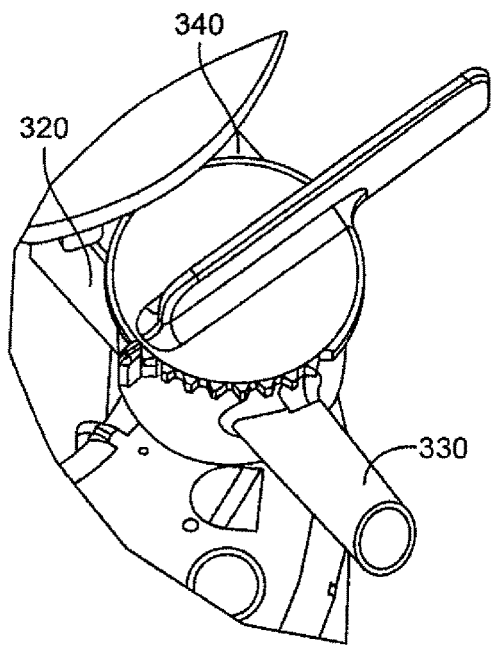
FIG. 4I is a perspective view corresponding to FIG. 4G.
Figure 4J:
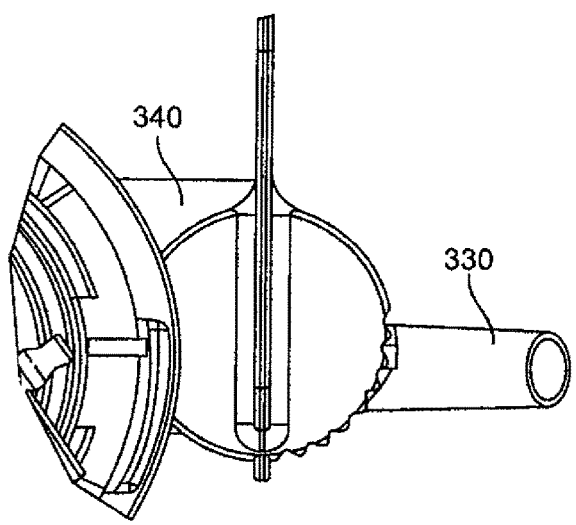
FIG. 4J is a top plan view corresponding to FIG. 4G.
Figure 4K:
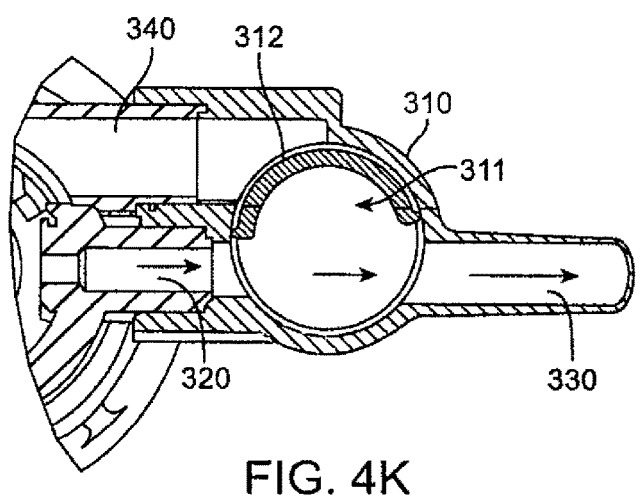
FIG. 4K is a top sectional view corresponding to FIG. 4G showing the internal flow path when the water path into the toilet bowl is fully opened.
Figure 4L:
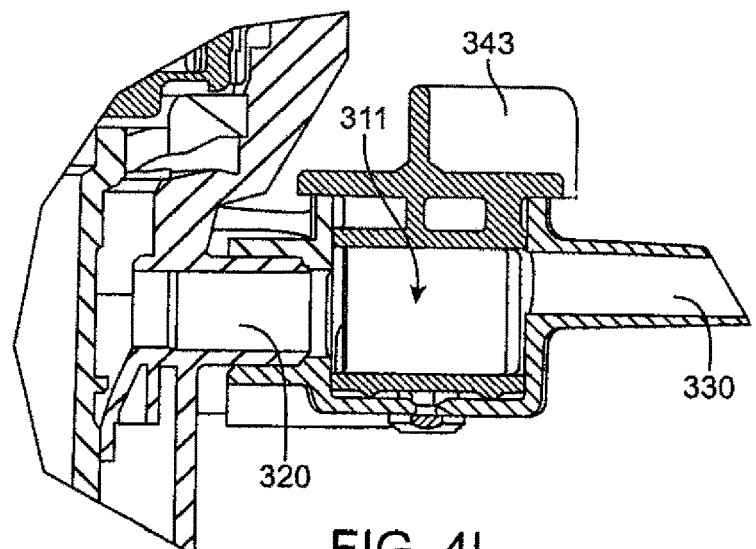
FIG. 4L is a sectional elevation view when the when the water path into the toilet bowl is partially opened.
Figure 4M:
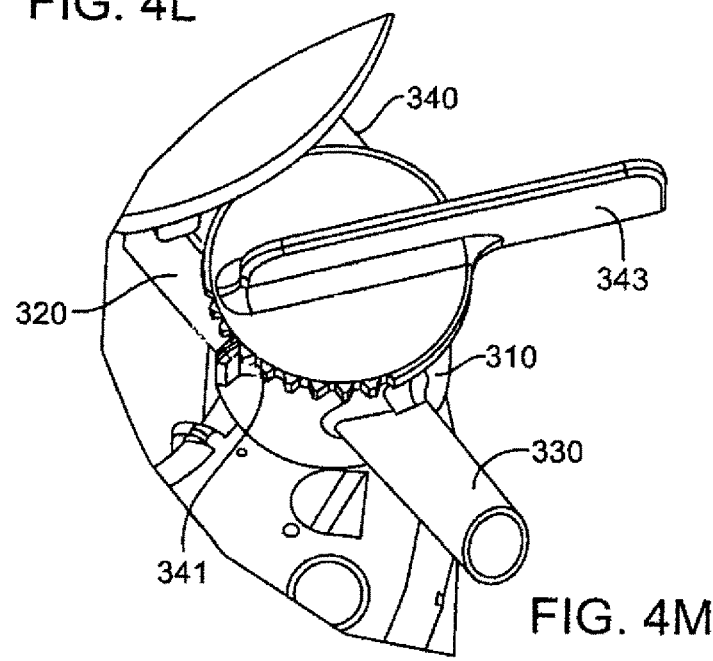
FIG. 4M is a perspective view corresponding to FIG. 4L showing a detent feature.
Figure 4N:
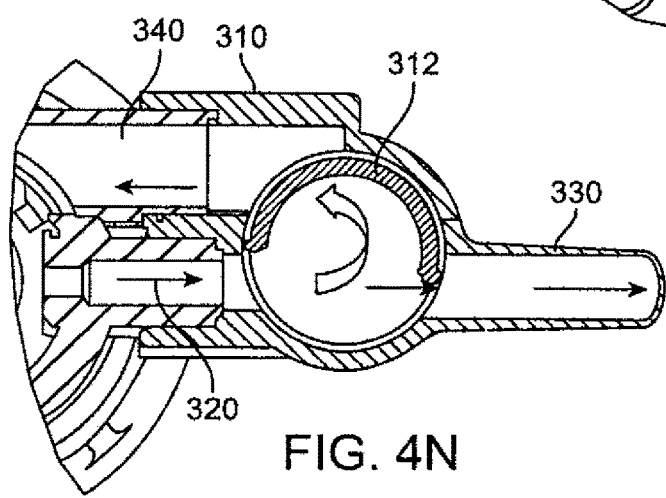
FIG. 4N is a top sectional view corresponding to FIG. 4L showing the internal flow path when the water path into the toilet bowl is partially opened.

FIGS. 4A to 4N illustrate a second embodiment of the flow diverter, as follows. FIG. 4A is an exploded perspective view of flow diverter 300 connected to fill valve 301. The majority of the water supplied by fill valve 301 passes out of lower outlet 312 to refill the tank. Only a smaller portion of fill water passes through flow diverter 300 (where it is either directed into the toilet bowl or into the toilet tank). As seen in FIGS. 4B to 4N, flow diverter 300 comprises a body 310 having an inlet 320, a first outlet 330 and a second outlet 340; and a flow adjustment mechanism 350 rotatable within body 310 to selectively divert different percentages of flow between first outlet 330 and second outlet 340. Preferably, flow out of first outlet 330 is diverted to the toilet bowl, and flow out of second outlet 340 is diverted back into the fill valve 301 where it then passes out of lower outlet 312 and into the toilet tank.

Body 310 preferably has a cylindrical section 311, and flow adjustment mechanism 350 comprises a curved rotatable wall portion 312 that can be rotated in cylindrical section 311 to block flow into either the first outlet 330 or the second outlet 340. As best seen in FIG. 4F, rotatable wall 312 preferably has a C-shaped cross section that extends approximately half way around the cylindrical section 311 of body 310.

FIG. 4B is a close-up side elevation view of the flow diverter of FIG. 4A, with the water flow path out of the outlet and into the toilet bowl fully closed. FIGS. 4C to 4F also show the fluid path into first outlet 330 fully closed. As can be seen in FIG. 4F, all of the flow from inlet 320 is directed into second outlet 340 (down through fill valve 301, out of lower outlet 321 and into the toilet tank).

FIGS. 4G to 4K show system 300 in an open position such that all of the flow from inlet 320 is directed out of first outlet 330 (and into the toilet bowl).

FIGS. 4L to 4N show system 300 in a partially open position such that some of the flow from inlet 330 is directed into first outlet 330 (and into the toilet bowl) and some of the flow from inlet is directed into second outlet 330 (and into the toilet tank). As can be appreciated, fine adjustments can be made to vary the percentages of water passing into each of the first and second outlets. As a result, the timing of the refilling of the bowl can be adjusted such that the toilet tank and the toilet bowl refill at the same time. FIG. 4M illustrates an optional detent 341 which mates with diverter body 310 to position the diverter at preferred intervals of operation. In one embodiment, detent 341 allows a user to click between various partially opened positions. In another embodiment, handle 343 is removed, and the end user is not permitted to adjust the setting of detent 341. This second "locked to the end user" embodiment could be desirable in situations where the position of the diverter is to be controlled by local building codes or rules, and should not be adjusted by the end user.

Figure 5A:
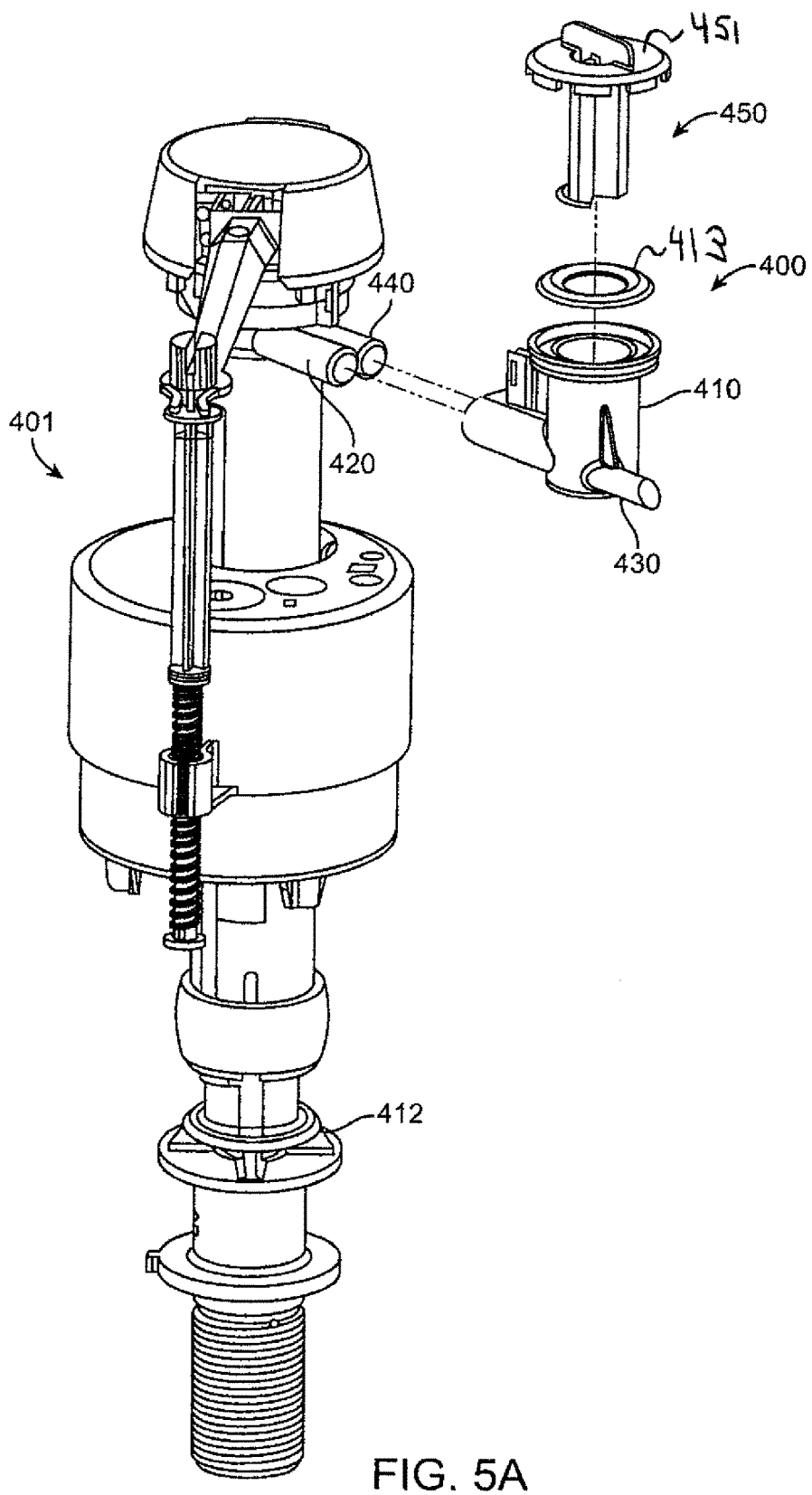
FIG. 5A is an exploded perspective view of a third embodiment of the flow diverter having an air vent and diaphragm operating as an anti-siphon system.
Figure 5F:
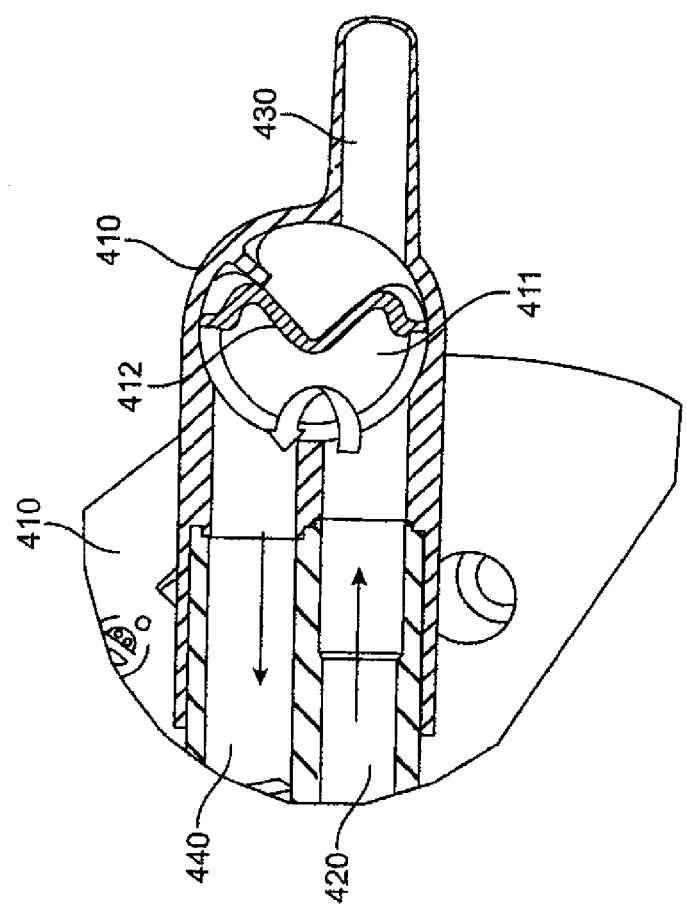
FIG. 5F is a top sectional view corresponding to FIG. 5B showing the internal flow path when the water path into the toilet bowl is fully closed.
Figure 5E:
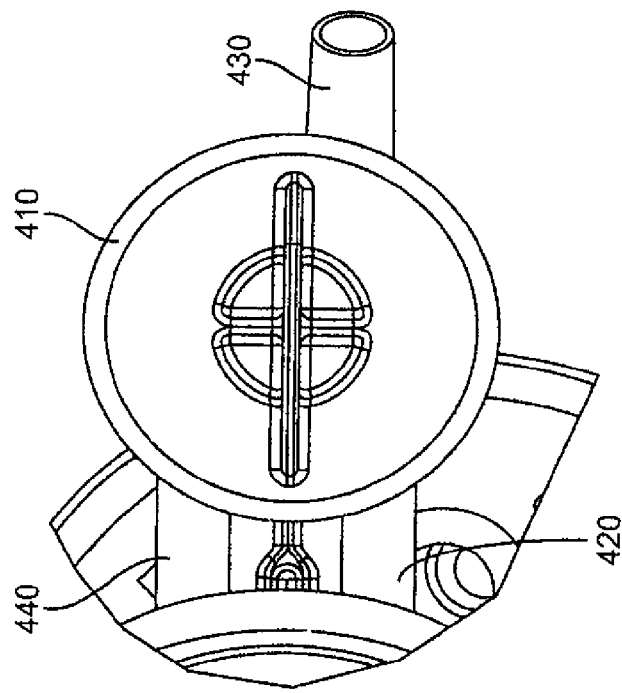
FIG. 5E is a top plan view corresponding to FIG. 5B.
Figure 5K:
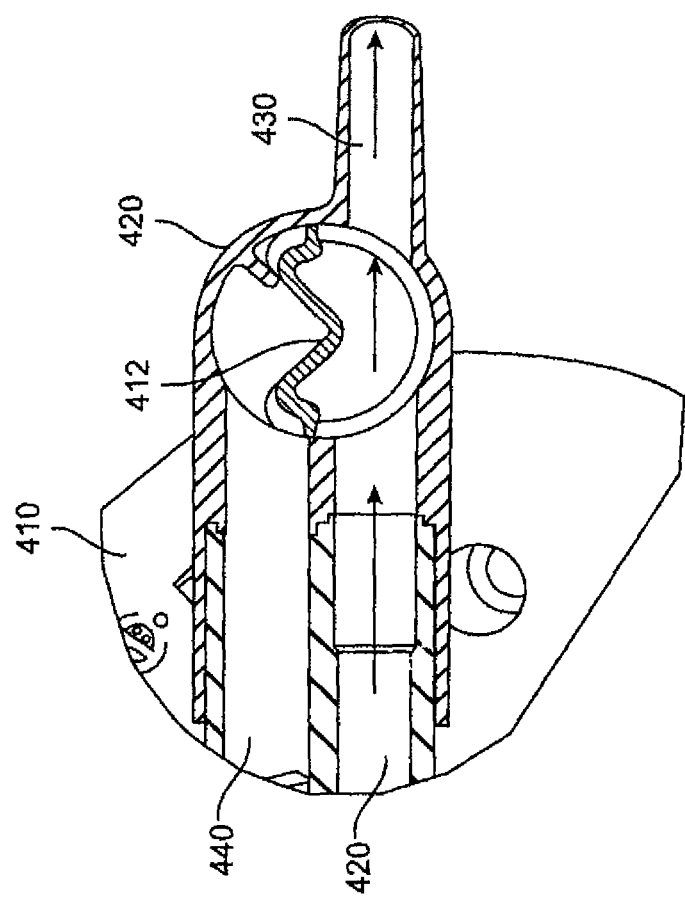
FIG. 5K is a top sectional view corresponding to FIG. 5G showing the internal flow path when the water path into the toilet bowl is fully opened.
Figure 5J:
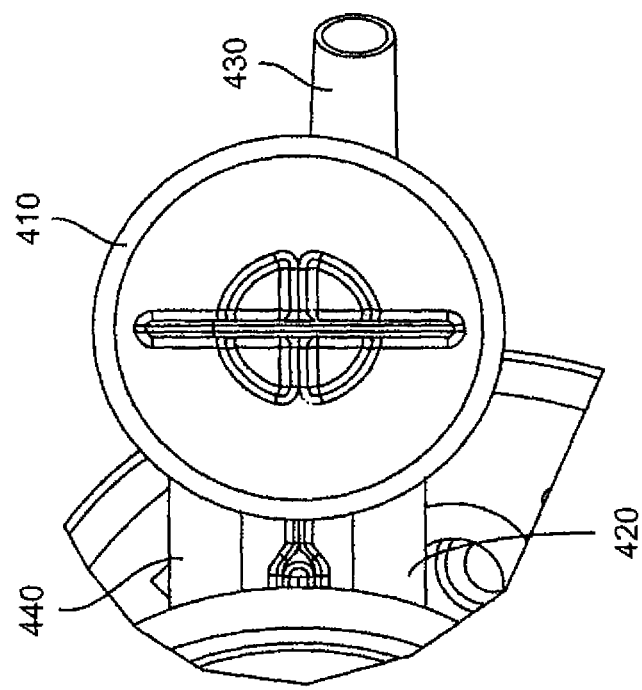
FIG. 5J is a top plan view corresponding to FIG. 5G.
Figure 5M:
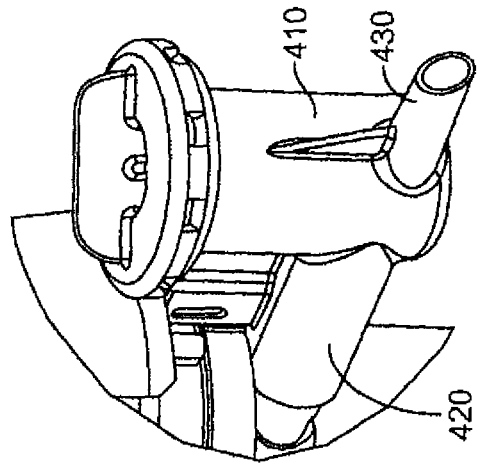
FIG. 5M is a perspective view corresponding to FIG. 5L.
Figure 5L:
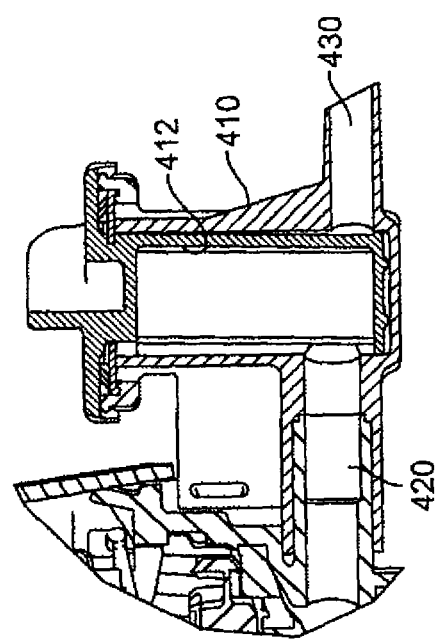
FIG. 5L is a sectional elevation view when the when the water path into the toilet bowl is partially opened.
Figure 5N:
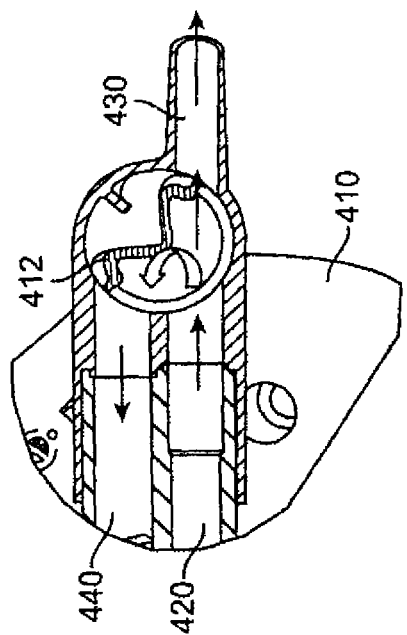
FIG. 5N is a top sectional view corresponding to FIG. 5L showing the internal flow path when the water path into the toilet bowl is partially opened.

FIGS. 5A to 5N illustrate a third embodiment of the flow diverter having a novel anti-siphon feature, as follows. FIG. 5A is an exploded perspective view of flow diverter 400 connected to fill valve 401. The majority of the water supplied by fill valve 401 passes out of lower outlet 412 to refill the tank. Only a smaller portion of fill water passes through flow diverter 300 (where it is either directed into the toilet bowl or back into the fill valve 401 and then out through lower outlet 412 and into the toilet tank). As seen in FIGS. 5B to 5N, flow diverter 400 comprises a body 410 having an inlet 420, a first outlet 430 and a second outlet 440; and a flow adjustment mechanism 450 rotatable within body 410 to selectively divert different percentages of flow between first outlet 430 and second outlet 440. A flexible diaphragm 413 is positioned below the top cap 451 of flow adjustment mechanism 450. Preferably, flow out of first outlet 430 is diverted to the toilet bowl, and flow out of second outlet 440 is diverted back into fill valve 401 and passes out of outlet 412 and to the toilet tank.

The embodiment of FIGS. 5A to 5N also has an air vent and diaphragm operating as an anti-siphon system, as follows. As seen in FIGS. 5B and 5C, an air vent 411 and a diaphragm 413 are provided. To prevent a siphon flow when suction is applied from fill valve 401 to inlet 420, air is drawn into air vent 411 where it then deflects diaphragm 413 upwardly to open a path into body 401 thereby permitting the air to be pulled into inlet 420. Thus, any suction force applied to inlet 420 will not simply siphon water back through outlet 430 and into fill valve 401. Rather, the deflection of diaphragm 413 (by air from vent 411) will enter the system and break the siphon flow. As can be seen, diaphragm 413 is positioned near the top of diverter 400 which is in turn positioned near the top of fill valve 401. As a result, the anti-siphon air passage around diaphragm 413 is positioned comparatively high in the toilet tank 4 above the water surface. As a result, the chance of diaphragm 413 being submerged in the tank is minimized. This safety feature (i.e.: high placement of diaphragm 413) increases the level of water that can be placed into the tank without the risk of the water submerging body 410 and thus placing diaphragm 413 under water (such that the anti-siphon feature would not work).

Similar to FIGS. 4A to 4F, FIGS. 5A to 5F show the operation of the flow diverter. FIG. 5F shows a W-shaped cross section of rotatable wall portion 412. As can be seen, the W-shaped cross section preferably extends across the center of cylindrical section 411 of body 410. FIGS. 5B to 5F illustrate the device in a fully closed position (such that all flow is directed out of second outlet 440). FIGS. 5G to 5K illustrate the device in a fully open position (such that all flow is directed out of first outlet 430). Lastly, FIGS. 5L to 5N illustrate the device in a partially open position (such that flow is directed out of both first outlet 430 and second outlet 440).

Figure 6A:
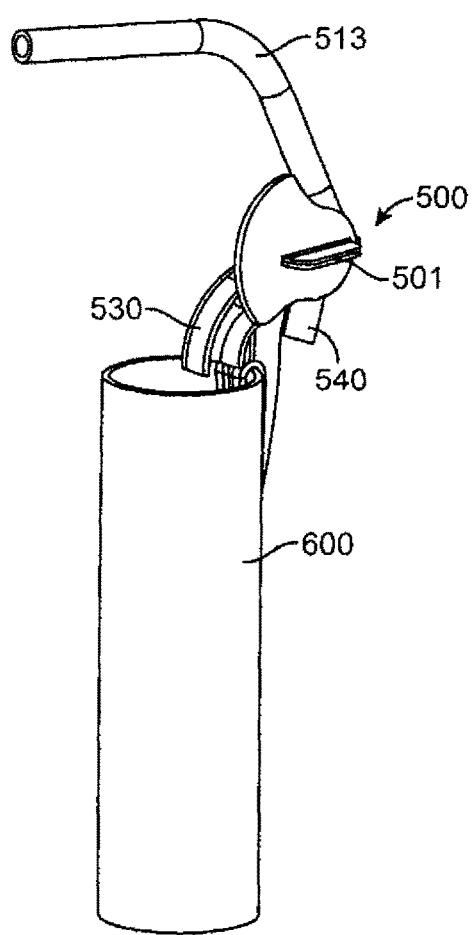
FIG. 6A is a perspective view of a fourth embodiment of the flow diverter.
Figure 6B:
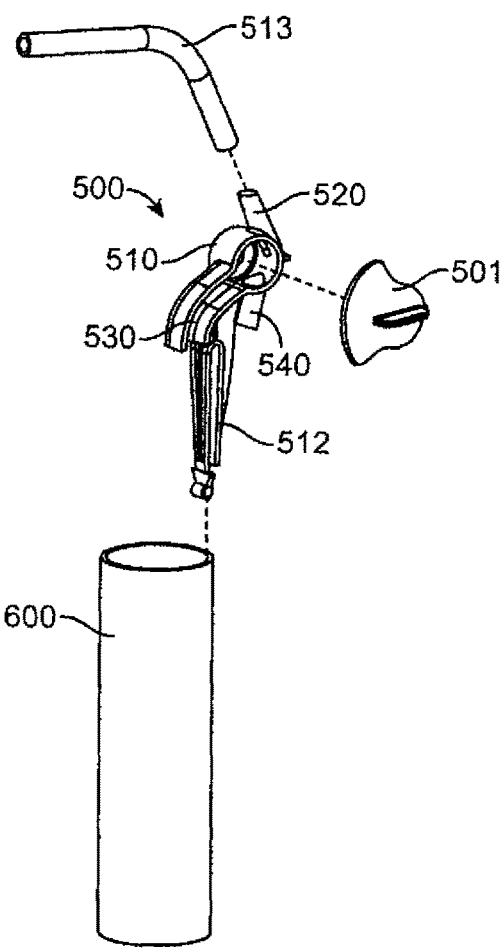
FIG. 6B is an exploded perspective view of the embodiment of FIG. 6A.
Figure 6E:
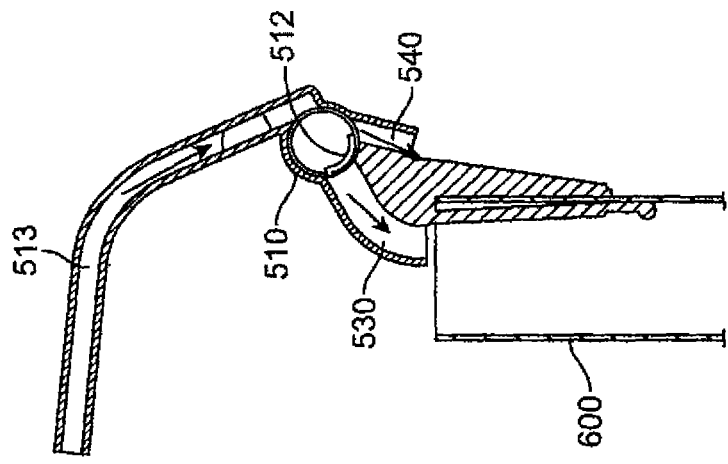
FIG. 6E is a side elevation view of the embodiment of FIG. 6A, with the bowl refill partially opened.
Figure 6D:
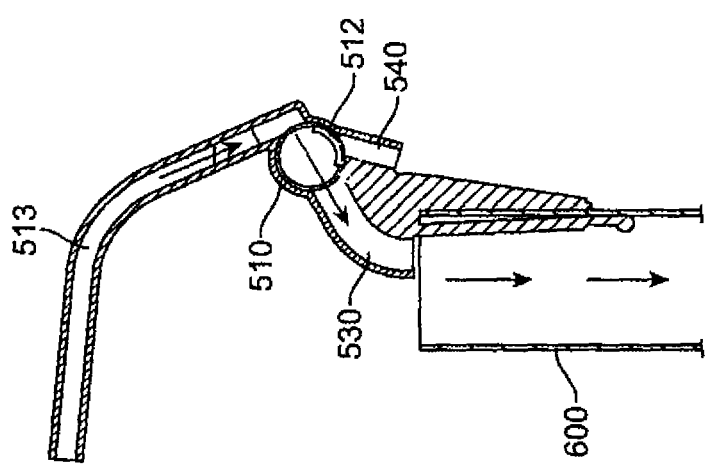
FIG. 6D is a side elevation view of the embodiment of FIG. 6A, with the bowl refill fully opened.
Figure 6C:
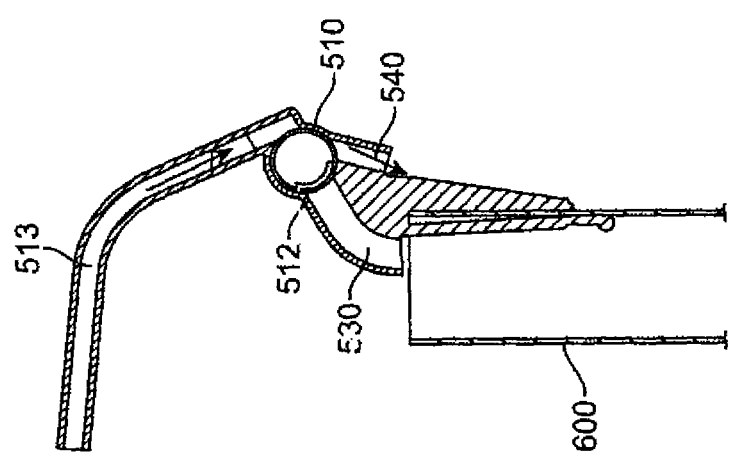
FIG. 6C is a side elevation view of the embodiment of FIG. 6A, with the bowl refill fully closed.

Lastly, FIGS. 6A to 6E illustrate a fourth embodiment of the flow diverter, as follows. FIGS. 6A and 6B illustrate flow diverter 500 having a body 510 with an inlet 520, a first outlet 530 and a second outlet 540. Body 510 comprises a handle 501, and an overflow tube clasp 512 for mounting the body onto an overflow tube 600 of a flush valve such that flow from first outlet 530 is directed into a mouth of overflow tube 600. Flow from second outlet 540 is directed into away from the mouth of overflow tube 600 and into a toilet tank (as seen in FIGS. 6C to 6E). Tube 513 is a fluid tube that sends flow from the fill valve (not illustrated) into inlet 520.

Next, as seen in FIGS. 6A to 6E, body 510 preferably comprises a flow adjustment mechanism such as a rotatable wall 512 which may optionally have a C-shaped cross section, as shown, wherein rotation of the flow adjustment rotatable wall 512 within body 510 varies the relative percentages of flow existing outlets 530 and 540. In FIG. 6C, all of the flow is being directed through second outlet 540 and down into the tank. In FIG. 6D, all of the flow is being directed through first outlet 530 and down into overflow tube 600 and down into the toilet bowl below. In FIG. 6E, some of the flow is directed into each of the two outlets 530 and 540 thereby both filling the toilet tank and the toilet bowl.

Many alterations and modifications may be made by those having ordinary skill in the art without departing from the spirit and scope of the embodiments disclosed and described herein. Therefore, it is understood that the illustrated and described embodiments have been set forth only for the purposes of examples and that they are not to be taken as limiting the embodiments as defined by the following claims. For example, notwithstanding the fact that the elements of a claim are set forth below in a certain combination, it must be expressly understood that the embodiments include other combinations of fewer, more or different elements, which are disclosed above even when not initially claimed in such combinations.

The definitions of the words or elements of the following claims are, therefore, defined in this specification to not only include the combination of elements which are literally set forth. It is also contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination(s).

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what incorporates the essential idea of the embodiments.

What is claimed is:

1. A flow diverter for diverting flow between a toilet bowl and a toilet tank, comprising:
   a body having an inlet, an outlet and a pressure relief vent between the inlet and the outlet; and
   a flow adjustment mechanism to selectively divert different percentages of flow between the outlet and the pressure relief vent,
   wherein a siphon force applied to the outlet draws air into the pressure relief vent.

2. A flow diverter for diverting flow between a toilet bowl and a toilet tank, comprising:
   a body having an inlet, an outlet and a pressure relief vent between the inlet and the outlet; and
   a flow adjustment mechanism to selectively divert different percentages of flow between the outlet and the pressure relief vent, wherein the flow adjustment mechanism is rotatable around the outlet of the body and comprises:
   a sleeve received over the outlet, the sleeve having a threaded inner surface that mates with a threaded outer surface of the outlet; and
   a stopper that is slidably received into the outlet.

3. The flow diverter of claim 2, wherein the stopper is moved axially in the outlet as the sleeve is rotated around the outlet to continuously adjust the size of a fluid path through the outlet.

4. The flow diverter of claim 1, wherein the body is curved such that flow into the inlet is not co-axial with flow out of the outlet.

5. The flow diverter of claim 1, wherein flow into the inlet is in a direction parallel to flow out of the outlet.

6. The flow diverter of claim 1, wherein flow from the outlet is diverted to the toilet bowl and flow out of the pressure relief vent is diverted to the toilet tank.

7. The flow diverter of claim 1, wherein flow from the outlet is diverted to the toilet tank and flow out of the pressure relief vent is diverted to the toilet bowl.

8. A flow diverter for diverting flow between a toilet bowl and a toilet tank, comprising:

a body having an inlet, a first outlet and a second outlet; and a flow adjustment mechanism rotatable within the body to selectively divert different percentages of flow between the first outlet and the second outlet, wherein the body has a cylindrical section, and wherein the flow adjustment mechanism comprises a curved rotatable wall portion that can be rotated in the cylindrical section to block flow into either the first outlet or the second outlet, wherein the rotatable wall has a C-shaped or W-shaped cross section that extends at least approximately one quarter of the way around the cylindrical section.

9. The flow diverter of claim 8, wherein the first outlet diverts flow to a toilet bowl, and a second outlet diverts flow to a toilet tank.

10. The flow diverter of claim 8, wherein the C-shaped cross section extends half way around the cylindrical section of the body.

11. The flow diverter of claim 8, further comprising a detent feature to selectively adjust the position of the curved rotatable wall within the cylindrical section.

12. The flow diverter of claim 8, wherein the body further comprises an overflow tube clasp for mounting the body onto an overflow tube such that flow from the first outlet is directed into a mouth of the overflow tube, and flow from the second outlet is directed into away from the mouth of the overflow tube and into a toilet tank.

13. The flow diverter of claim 8, wherein flow from the second outlet is directed back into the fill valve.

14. A flow diverter for diverting flow between a toilet bowl and a toilet tank, comprising:

a body having an inlet, a first outlet and a second outlet; and a flow adjustment mechanism rotatable within the body to selectively divert different percentages of flow between the first outlet and the second outlet; and an air vent and diaphragm in the body to prevent a siphon flow from the first or second outlet back to the inlet.

15. The flow diverter of claim 14, wherein the first outlet diverts flow to a toilet bowl, and a second outlet diverts flow to a toilet tank.

16. The flow diverter of claim 14, wherein the body has a cylindrical section, and wherein the flow adjustment mechanism comprises a curved rotatable wall portion that can be rotated in the cylindrical section to block flow into either the first outlet or the second outlet.

17. The flow diverter of claim 16, wherein flow from the second outlet is directed back into the fill valve.

18. The flow diverter of claim 14, wherein flow from the second outlet is directed back into the fill valve.

19. The flow diverter of claim 14, wherein the diaphragm in the body is positioned near the top of the body of the flow diverter.

20. The flow diverter of claim 14, wherein the diaphragm in the body is positioned above the inlet, first outlet and second outlet of the flow diverter.

21. The flow diverter of claim 14, wherein the diaphragm in the body is positioned under a top cap of the body.

22. The flow diverter of claim 14, wherein the diaphragm extends around the circumference of the body.

* * * * *